(12) United States Patent
Toyoda et al.

(10) Patent No.: US 12,469,344 B2
(45) Date of Patent: Nov. 11, 2025

(54) TIRE TEMPERATURE PREDICTION SYSTEM, TIRE TEMPERATURE PREDICTION PROGRAM, AND TIRE TEMPERATURE PREDICTION METHOD

(71) Applicant: BRIDGESTONE CORPORATION, Tokyo (JP)

(72) Inventors: Kenji Toyoda, Tokyo (JP); Kosuke Akiba, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 152 days.

(21) Appl. No.: 18/286,804

(22) PCT Filed: Mar. 9, 2022

(86) PCT No.: PCT/JP2022/010160
§ 371 (c)(1),
(2) Date: Oct. 13, 2023

(87) PCT Pub. No.: WO2022/224609
PCT Pub. Date: Oct. 27, 2022

(65) Prior Publication Data
US 2024/0185654 A1     Jun. 6, 2024

(30) Foreign Application Priority Data

Apr. 19, 2021 (JP) ................................. 2021-070230

(51) Int. Cl.
*G07C 5/10* (2006.01)
*B60C 23/20* (2006.01)

(52) U.S. Cl.
CPC ............... *G07C 5/10* (2013.01); *B60C 23/20* (2013.01)

(58) Field of Classification Search
CPC ......... B60C 19/00; B60C 23/04; B60C 23/20; G07C 5/10
See application file for complete search history.

(56) References Cited

U.S. PATENT DOCUMENTS

| 6,809,637 | B1 * | 10/2004 | Brown | ................ B60C 23/0408 340/447 |
| 6,871,162 | B2 * | 3/2005 | Futamura | ................ G06F 30/23 702/33 |

(Continued)

FOREIGN PATENT DOCUMENTS

| CN | 104517441 A | 4/2015 |
| JP | 2017-219477 A | 12/2017 |

(Continued)

OTHER PUBLICATIONS

International Search Report for PCT/JP2022/010160 dated Apr. 26, 2022 (PCT/ISA/210).

*Primary Examiner* — Tyler J Lee
(74) *Attorney, Agent, or Firm* — Sughrue Mion, PLLC (57) ABSTRACT

The present invention is provided with a time-sequential load data acquisition unit that acquires data on a load of a predetermined loaded item in a time-sequential manner regarding a loading vehicle capable of loading the predetermined loaded item; a unit period setting unit that sets predetermined unit periods of which it is possible to change lengths according to a change in the load; a data division unit that divides time-sequential load data on the load of the loaded item by separating the time-sequential load data according to the unit periods; a representative value calculation unit that calculates respective representative values for each piece of divided data of the time-sequential load data divided by the data division unit; and a tire temperature prediction unit that predicts a temperature of tires mounted (Continued)

on the loading vehicle, at a specific time point, based on the respective representative values.

17 Claims, 5 Drawing Sheets

(56) References Cited

U.S. PATENT DOCUMENTS

| | | | | |
|---|---|---|---|---|
| 6,963,273 | B2* | 11/2005 | O'Brien | B60C 23/20 340/588 |
| 7,461,713 | B2* | 12/2008 | Kojima | B60C 23/0408 180/277 |
| 9,636,956 | B2* | 5/2017 | Xu | B60W 40/12 |
| 10,507,697 | B2* | 12/2019 | Spinnler | B60C 23/20 |
| 10,514,322 | B2* | 12/2019 | Uhrich | B60C 23/20 |
| 11,298,992 | B2* | 4/2022 | Iancu | B60C 23/20 |
| 11,312,188 | B2* | 4/2022 | Tamura | B60C 19/00 |
| 11,865,875 | B2* | 1/2024 | Birdsall | B60C 23/0401 |
| 2006/0093015 | A1* | 5/2006 | Ichihara | B60C 23/20 374/45 |
| 2018/0015793 | A1 | 1/2018 | Spinnler et al. | |
| 2019/0160886 | A1 | 5/2019 | Tamura et al. | |
| 2019/0187026 | A1* | 6/2019 | Uhrich | B60C 23/002 |
| 2022/0001707 | A1* | 1/2022 | Iancu | B60C 23/20 |
| 2022/0055422 | A1* | 2/2022 | Birdsall | B60C 23/0479 |
| 2022/0198844 | A1* | 6/2022 | Rottkamp | B60C 23/0493 |

FOREIGN PATENT DOCUMENTS

| | | |
|---|---|---|
| JP | 2017-226392 A | 12/2017 |
| JP | 2018-086892 A | 6/2018 |

* cited by examiner

TIRE TEMPERATURE PREDICTION SYSTEM, TIRE TEMPERATURE PREDICTION PROGRAM, AND TIRE TEMPERATURE PREDICTION METHOD

CROSS REFERENCE TO RELATED APPLICATIONS

This application is a National Stage of International Application No. PCT/JP2022/010160 filed Mar. 9, 2022, claiming priority based on Japanese Patent Application No. 2021-070230 filed Apr. 19, 2021.

TECHNICAL FIELD

The present invention relates to a tire temperature prediction system, a tire temperature prediction program, and a tire temperature prediction method which are applicable to a loading vehicle such as a dump truck for a mine.

BACKGROUND ART

A technique has been proposed in which the temperature of tires are predicted in a loading vehicle such as a dump truck used in a mine (Patent Literature 1). This makes it possible to grasp the internal temperature of the tires, thereby preventing tire failures and performing vehicle operation efficiently.

CITATION LIST

Patent Literature

Patent Literature 1: JP 2018-86892 A

SUMMARY OF THE INVENTION

In the prior technology, when tire temperature prediction is performed, load data and vehicle speed data are acquired from a vehicle in a time-sequential manner, and the tire temperature prediction is performed using all of the time-sequential data. For this reason, the amount of computation in temperature prediction becomes enormous, causing a problem that the computational load in a processing device increases.

In particular, when the temperature prediction for each tire for multiple vehicles is performed by an external device such as an operation management server, how to reduce the computational load in performing temperature prediction has become a problem.

Therefore, the present invention has been made in view of the above problem, and an object of the present invention is to provide a tire temperature prediction system, a tire temperature prediction program, and a tire temperature prediction method with which it is possible to reduce the computational load when performing temperature prediction for tires.

A tire temperature prediction system according to an aspect of the present invention includes: a time-sequential load data acquisition unit that acquires data on a load of a predetermined loaded item in a time-sequential manner regarding a loading vehicle capable of loading the predetermined loaded item; a unit period setting unit that sets predetermined unit periods of which it is possible to change lengths according to a change in the load; a data division unit that divides time-sequential load data on the load of the loaded item by separating the time-sequential load data according to the unit periods; a representative value calculation unit that calculates respective representative values for each piece of divided data of the time-sequential load data divided by the data division unit; and a tire temperature prediction unit that predicts a temperature of tires mounted on the loading vehicle, at a specific time point, based on the respective representative values.

This configuration makes it possible to reduce the computational load when predicting the temperature of the tires compared to using all of the time-sequential data.

In addition, the tire temperature prediction system further includes a time-sequential speed data acquisition unit that acquires data on speed of the loading vehicle in a time-sequential manner, in which the data division unit divides time-sequential speed data on the speed of the loading vehicle by separating the time-sequential speed data according to the unit periods, the representative value calculation unit calculates respective representative values for each piece of divided data of the time-sequential speed data divided by the data division unit, and the tire temperature prediction unit predicts the temperature of the tires mounted on the loading vehicle, at a specific time point, with the respective representative values for each piece of divided data of the time-sequential speed data being taken into consideration.

This makes it possible to improve the accuracy of tire temperature prediction and reduce the computational load.

In addition, the tire temperature prediction system further includes a load change data calculation unit that calculates data on a change in the load, in which the unit period setting unit separates and sets the unit periods when the data on the change in the load changes beyond a predetermined value.

This makes it possible to further reduce the computational load when predicting the temperature of the tires according to a change in the load.

In addition, the representative value includes either an average value, a median value, or a mode value in a unit period.

This makes it possible to handle various correction methods when predicting the temperature of the tires.

A tire temperature prediction program according to another aspect of the present invention, which is executed by a tire temperature prediction system, includes: a time-sequential load data acquisition step of acquiring data on a load of a predetermined loaded item in a time-sequential manner regarding a loading vehicle capable of loading the predetermined loaded item; a unit period setting step of setting predetermined unit periods of which it is possible to change lengths according to a change in the load; a data division step of dividing time-sequential load data on the load of the loaded item by separating the time-sequential load data according to the unit periods; a representative value calculation step of calculating respective representative values for each piece of divided data of the time-sequential load data divided in the data division step; and a tire temperature prediction step of predicting a temperature of tires mounted on the loading vehicle, at a specific time point, based on the respective representative values.

A program having such a configuration makes it possible to reduce the computational load when predicting the temperature of the tires compared to using all of the time-sequential data.

In addition, the tire temperature prediction program further includes a time-sequential speed data acquisition step of acquiring data on speed of the loading vehicle in a time-sequential manner, in which in the data division step, time-sequential speed data on the speed of the loading vehicle is divided by separating the time-sequential speed data the according to the unit periods, in the representative value calculation step, respective representative values are calculated for each piece of divided data of the time-sequential speed data divided in the data division step, and in the tire temperature prediction step, the temperature of the tires mounted on the loading vehicle is predicted, at a specific time point, with the respective representative values for each piece of divided data of the time-sequential speed data being taken into consideration.

This makes it possible to improve the accuracy of tire temperature prediction and reduce the computational load.

A tire temperature prediction method according to another aspect of the present invention includes: a time-sequential load data acquisition process of acquiring data on a load of a predetermined loaded item in a time-sequential manner regarding a loading vehicle capable of loading the predetermined loaded item; a unit period setting process of setting predetermined unit periods of which it is possible to change lengths according to a change in the load; a data division process of dividing time-sequential load data on the load of the loaded item by separating the time-sequential load data according to the unit periods; a representative value calculation process of calculating respective representative values for each piece of divided data of the time-sequential load data divided in the data division process; and a tire temperature prediction process of predicting a temperature of tires mounted on the loading vehicle, at a specific time point, based on the respective representative values.

A method having such a procedure makes it possible to reduce the computational load when predicting the temperature of the tires compared to using all of the time-sequential data.

In addition, the tire temperature prediction method further includes a time-sequential speed data acquisition process of acquiring data on speed of the loading vehicle in a time-sequential manner, in which in the data division process, time-sequential speed data on the speed of the loading vehicle is divided by separating the time-sequential speed data according to the unit periods, in the representative value calculation process, respective representative values are calculated for each piece of divided data of the time-sequential speed data divided in the data division process, and in the tire temperature prediction process, a temperature of the tires mounted on the loading vehicle is predicted, at a specific time point, with the respective representative values for each piece of divided data of the time-sequential speed data being taken into consideration.

This makes it possible to improve the accuracy of tire temperature prediction and reduce the computational load.

The present embodiment makes it possible to provide a tire temperature prediction system, a tire temperature prediction program, and a tire temperature prediction method with which it is possible to reduce the computational load when performing temperature prediction for tires.

DESCRIPTION OF EMBODIMENT

Figure 1:
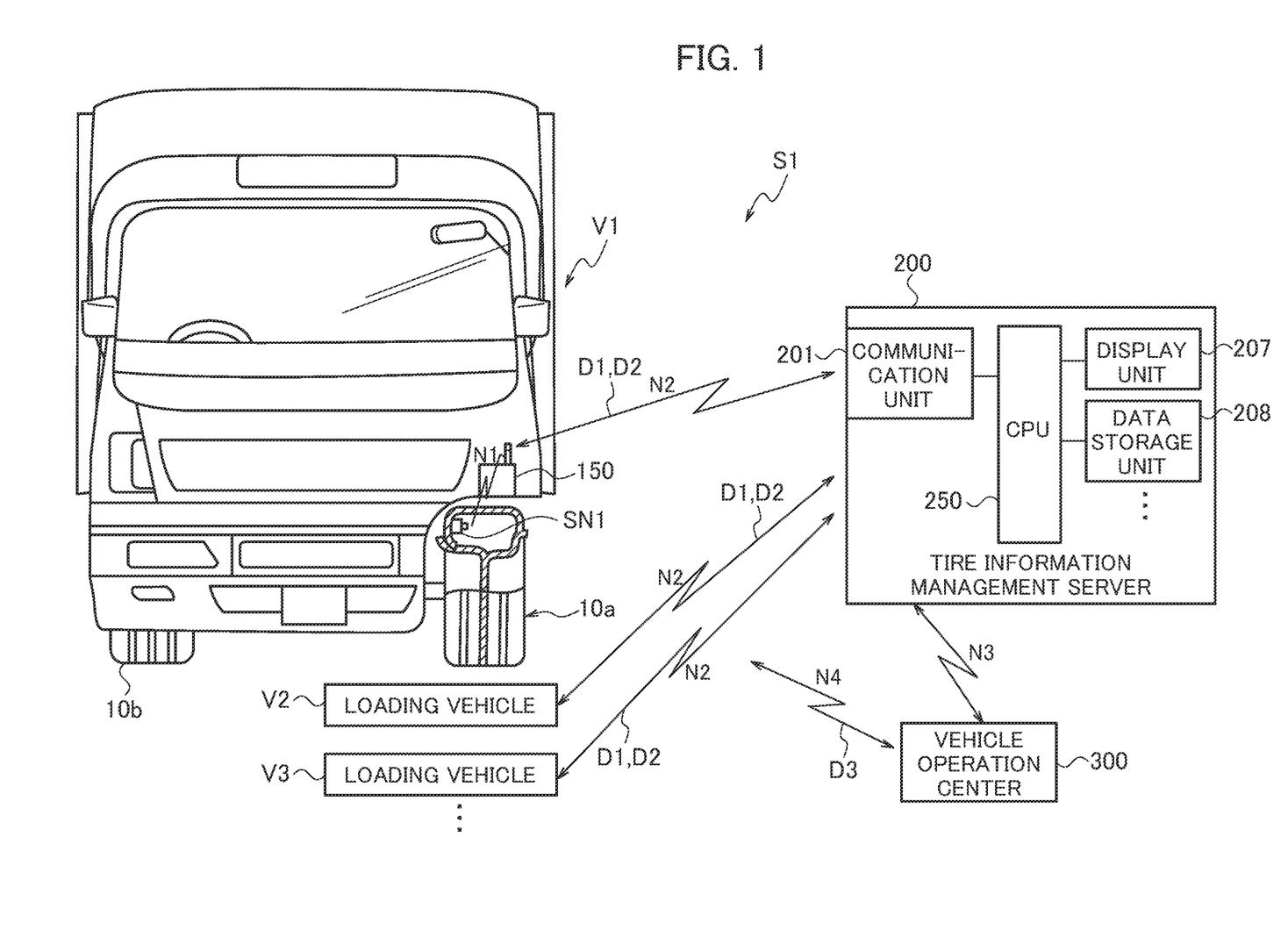
FIG. 1 is a schematic configuration diagram illustrating a schematic configuration of a tire temperature prediction system according to an embodiment.
Figure 2:
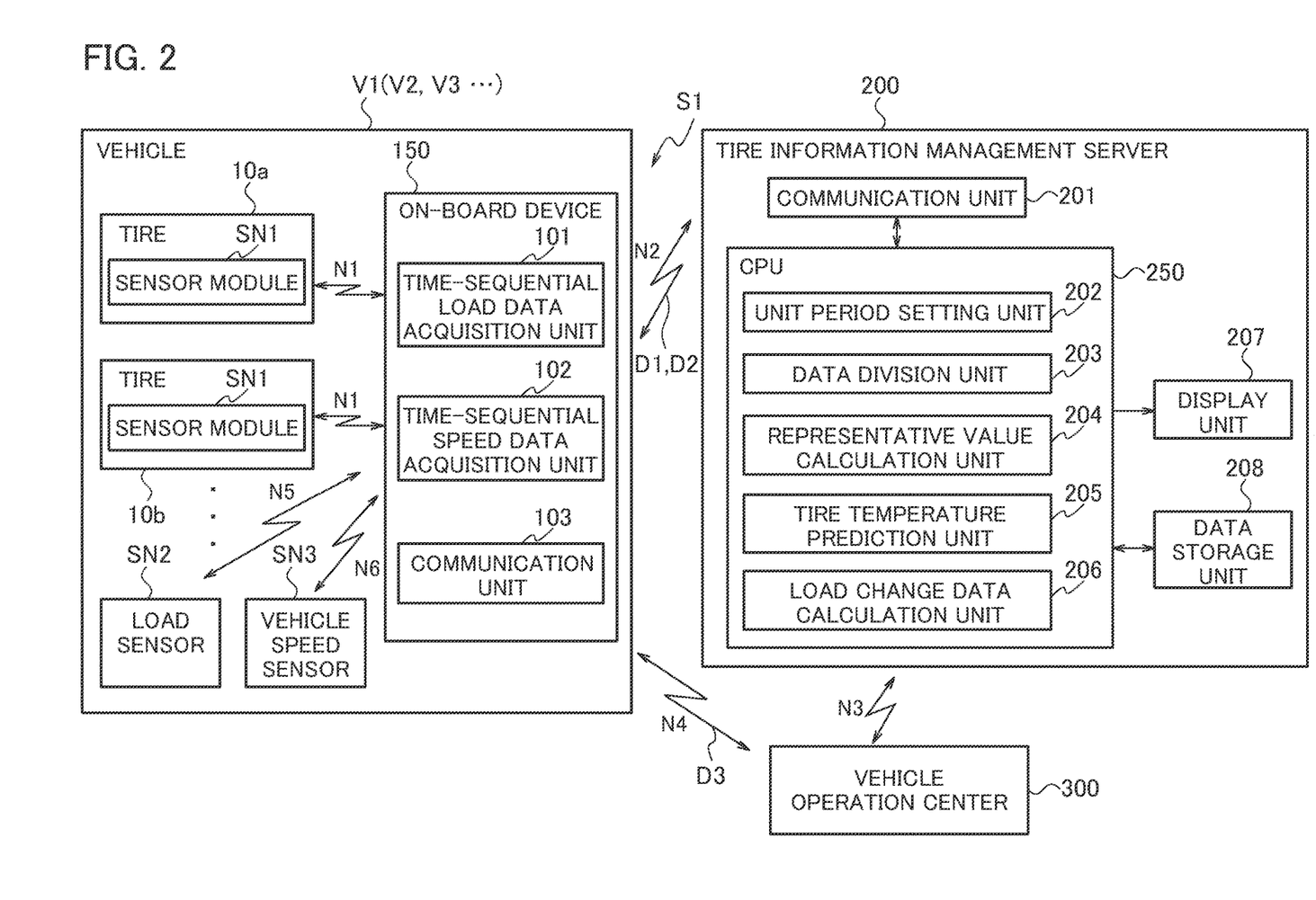
FIG. 2 is a functional block diagram illustrating a functional configuration of the tire temperature prediction system according to the embodiment.

A tire temperature prediction system S1 according to an embodiment of the present invention will be described with reference to FIGS. 1 and 2.

Note that the same or similar portions are denoted by the same or similar reference numerals in the following descriptions of the drawings. It should be noted however that the drawings are schematic and ratios of dimensions and the like are different from the actual ones.

Accordingly, specific dimensions and the like should be determined in consideration of the following descriptions. Moreover, it is needless to say that the drawings include parts showing dimensional relations and ratios that are different from each other.

(Schematic Configuration of Tire Temperature Prediction System)

A schematic configuration of the tire temperature prediction system S1 according to the embodiment will be described with reference to the schematic configuration diagram of FIG. 1.

The tire temperature prediction system S1 includes: a plurality of loading vehicles V1 (V2, V3 . . . ); a tire information management server 200 that manages temperature information and the like regarding tires 10 (10a, 10b . . . ) of each loading vehicle V1 (V2, V3 . . . ); and a vehicle operation center 300 that manages the operation of the loading vehicles V1 (V2, V3 . . . ).

For example, the loading vehicles V1 (V2, V3 . . . ) may be mine dump trucks that transport various mineral resources to a predetermined destination at a mining site 600 (see FIG. 3 or the like), although the loading vehicles V1 (V2, V3 . . . ) are not particularly limited thereto.

Figure 3:
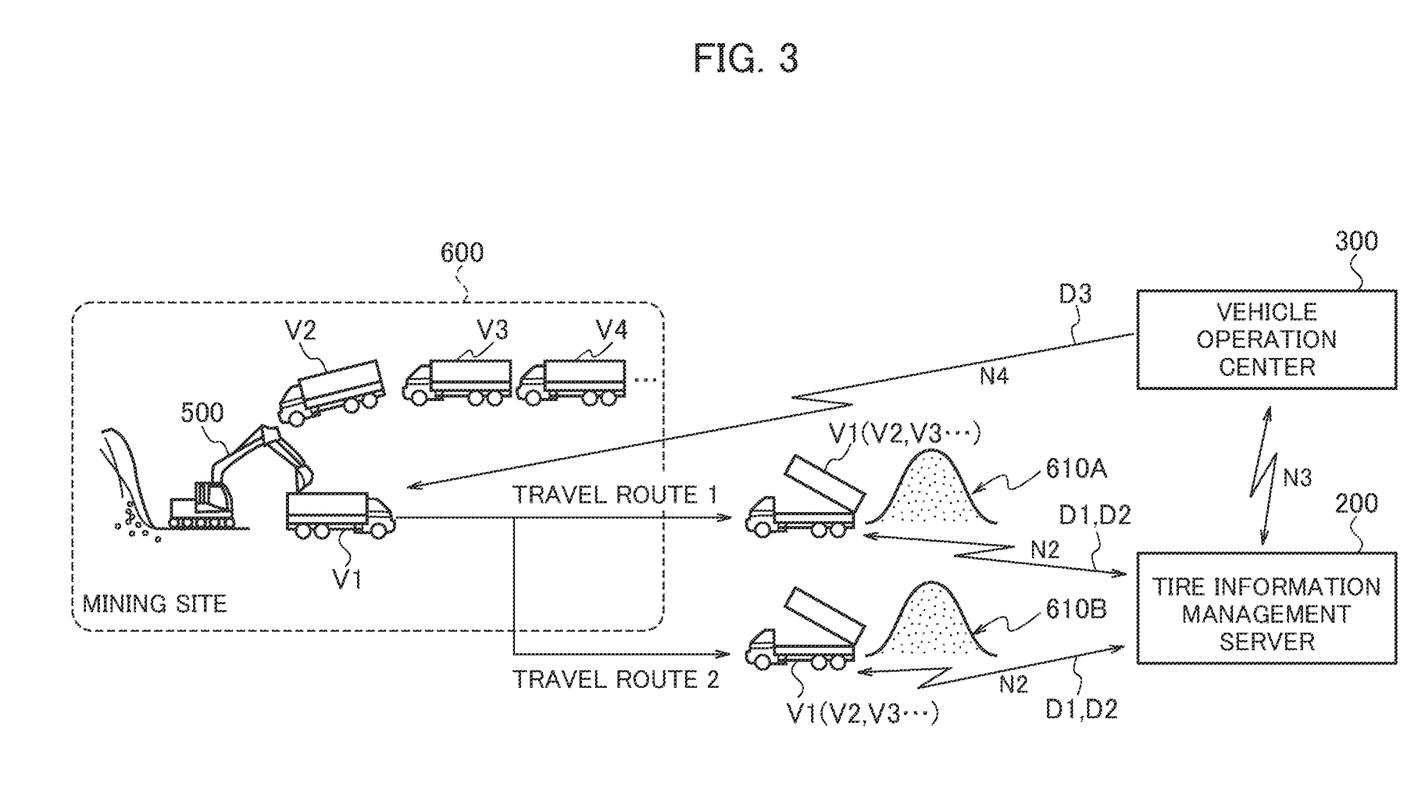
FIG. 3 is an explanatory view illustrating an operation example of the tire temperature prediction system according to the embodiment.

As illustrated in FIG. 3 which will be described later, the loading platform of the loading vehicles V1 (V2, V3 . . . ) is loaded with mineral resources with a predetermined load by an excavator 500.

The loading vehicles V1 (V2, V3 . . . ) which are loaded with mineral resources as loaded items travel to a plurality of destinations 610A, 610B, and the like along travel paths having different road surface conditions, incline conditions, travel distances, or the like (see FIG. 3).

Each loading vehicle V1 (V2, V3 . . . ) includes: a sensor module SN1 installed in each tire 10 (10a, 10b . . . ) to acquire temperature information or the like; and an on-board device 150 that acquires temperature information or the like from the sensor module SN1 via a wireless link N1 and performs various processing. As described later, the on-board device 150 includes: a time-sequential load data acquisition unit 101 that acquires data on the load of a loaded item in a time-sequential manner; a time-sequential speed data acquisition unit 102 that acquires data on the speed of a loading vehicle in a time-sequential manner; and a communication unit 103 that transmits various data to the tire information management server 200. A configuration example of the on-board device 150 will be described later.

The tire information management server 200 includes: a communication unit 201 that transmits and receives various information to/from the on-board device 150 via a wireless link N2; a CPU 250 that is configured of a unit period setting unit 202 or the like which will be described later; a display unit 207 that is configured of a monitor or the like that displays various information; and a data storage unit 208 that is configured of a hard disk or the like that stores various information.

The vehicle operation center 300 is configured to receive data on tire temperature and the like predicted by the tire information management server 200 via a wireless link N3 and to transmit information on vehicle operation to each loading vehicle V1 (V2, V3 . . . ) at a predetermined timing via a wireless link N4.

(Functional Configuration of Tire Temperature Prediction System)

The loading vehicles V1 (V2, V3 . . . ) capable of loading loaded items such as various mineral resources are mounted with tires 10a, 10b . . . that are provided with a sensor module SN1 that acquires temperature information or the like. The sensor module SN1 transmits temperature information or the like to the on-board device 150 via the wireless link N1.

The temperature information or the like acquired by the sensor module SN1 can be used to correct the tire temperature predicted by a tire temperature prediction unit 205.

The on-board device 150 mounted with each loading vehicle V1 (V2, V3 . . . ) includes the time-sequential load data acquisition unit 101 that acquires data on the load of a loaded item in a time-sequential manner.

A method by which the time-sequential load data acquisition unit 101 acquires data on a load is not particularly limited. For example, the data can be acquired, via a wireless link N5, from a load sensor SN2 that detects a shaft weight and a wheel weight of each loading vehicle V1 (V2, V3 . . . ). In addition, the interval at which the data on a load is acquired in a time-sequential manner is not particularly limited. For example, the interval may be set to every second.

The on-board device 150 includes the time-sequential speed data acquisition unit 102 that acquires data on the speed of each loading vehicle V1 (V2, V3 . . . ) in a time-sequential manner.

For example, the data on the speed can be acquired from a vehicle speed sensor SN3 or the like included in each loading vehicle V1 (V2, V3 . . . ) via a wireless link N6. In addition, the interval at which the data on the speed is acquired in a time-sequential manner is not particularly limited. For example, the interval may be set to every second.

The on-board device 150 also includes a communication unit 103 that transmits and receives time-sequential load data D1, time-sequential speed data D2, and the like to/from the tire information management server 200 via the wireless link N2.

Meanwhile, the tire information management server 200 includes the unit period setting unit 202 that sets predetermined unit periods (T1a, T1b, T1c, etc.) of which it is possible to change the lengths according to a change in load. An example of the unit period will be described later.

The tire information management server 200 also includes a data division unit 203 that divides the time-sequential load data D1 on the load of a loaded item by separating the time-sequential load data D1 according to the unit periods. The data division unit 203 also divides the time-sequential speed data D2 on the speed of the loading vehicles V1 (V2, V3 . . . ) by separating the unit periods. An example of dividing each data will be described later.

In addition, the tire information management server 200 also includes a representative value calculation unit 204 that calculates respective representative values for each piece of divided data of the time-sequential load data D1 divided by the data division unit 203.

The representative value calculation unit 204 also calculates respective representative values for each piece of divided data of the time-sequential speed data D2 divided by the data division unit 203.

In addition, the representative value described above includes either an average value, a median value, or a mode value in the unit period.

The tire information management server 200 also includes a tire temperature prediction unit 205 that predicts the temperature of the tires 10a, 10b . . . mounted on the loading vehicles V1 (V2, V3 . . . ), at a specific time point, based on respective representative values.

The tire temperature prediction unit 205 may predict the temperature of the tires 10a, 10b . . . at a specific time point, with respective representative values for each piece of divided data of the time-sequential speed data D2 being taken into consideration.

The tire information management server 200 also includes a load change data calculation unit 206 that calculates data on a change in the load, and the unit period setting unit 202 separates and sets the unit periods (T1a, T1b, T1c, etc.) when the data on the change in the load changes beyond a predetermined value.

The unit period setting unit 202, the data division unit 203, the representative value calculation unit 204, the tire temperature prediction unit 205, and the load change data calculation unit 206 are configured of a CPU 250 or the like provided in the tire information management server 200.

The tire information management server 200 also includes the communication unit 201 that transmits and receives the time-sequential load data D1, the time-sequential speed data D2, and the like to/from the on-board device 150 via the wireless link N2. In addition, the communication unit 201 has a function of transmitting and receiving data on the tire temperature or the like, which is predicted by the tire temperature prediction unit 205, to/from the vehicle operation center 300 serving as an external system via the communication line N3.

The tire information management server 200 also includes a display unit 207 configured of a monitor or the like that displays data on the tire temperature predicted by the tire temperature prediction unit 205, and a data storage unit 208 that stores data on the predicted tire temperature or the like for each loading vehicle V1 (V2, V3 . . . ).

The vehicle operation center 300 has a function of transmitting instruction information D3 or the like for instructing a change of the travel speed and travel path of the loading vehicles V1 (V2, V3 . . . ) to the on-board device 150 via the wireless link N4, based on data on the tire temperature or the like predicted by the tire temperature prediction unit 205.

The loading vehicles V1 (V2, V3 . . . ) may be a type of vehicle that is provided with an automatic driving device for automatic driving based on the instruction information D3 or the like for instructing a change of the travel speed or travel path that is transmitted from the vehicle operation center 300, or may be a type of vehicle that is driven manually by a driver based on the instruction information or the like.

(Operation Example of Loading Vehicle)

An operation example of the loading vehicles V1 (V2, V3 . . . ) will be described with reference to FIG. 3.

In the operation example of the tire temperature prediction system S1 illustrated in FIG. 3, the loading vehicles V1

(V2, V3 . . . ) are loaded with mineral resources by the excavator 500 at a mining site 600, and transport the mineral resources to the destination 610A or the destination 610B along a predetermined travel path 1 or 2.

Here, it is assumed that the travel path 1 is a path with which there is a relatively large load on the tires 10 (10a, 10b . . . ) (for example, poor road conditions, a high slope, rough undulation, or the like), and which has a relatively short distance.

In contrast, it is assumed that the travel path 2 is a path with which there is a relatively small load on the tires 10 (10a, 10b . . . ) (for example, good road conditions, a low slope, less undulation, or the like), and which has a relatively long distance.

The on-board device 150 of the loading vehicles V1 (V2, V3 . . . ) transmits the acquired time-sequential load data D1 and the acquired time-sequential speed data D2 to the tire information management server 200 via the wireless link N2.

The load data can also be acquired from the operation information of the excavator 500.

Upon receiving the time-sequential load data D1 and the time-sequential speed data D2, the tire information management server 200 executes a program for tire temperature prediction calculation processing which will be described later, and predicts the temperature of each tire 10 (10a, 10b . . . ).

The tire information management server 200 transmits data on the predicted tire temperature to the vehicle operation center 300 via the wireless link N3.

Based on the data on the predicted tire temperature or the like, the vehicle operation center 300 gives an instruction to change the operation of each loading vehicle V1 (V2, V3 . . . ).

More specifically, for example, when the temperature of the tires 10 (10a, 10b . . . ) increases, the instruction information D3 that instructs the loading vehicle to change the travel path from 1 to 2 or to reduce the travel speed is transmitted to the on-board vehicle 150 via the wireless link N4, so as to reduce the burden on the tires 10 (10a, 10b . . . ).

This makes it possible to reduce the burden on the tires 10 (10a, 10b . . . ) of each loading vehicle V1 (V2, V3 . . . ), thereby making it possible to perform safer and more efficient vehicle operation.

The loading vehicles V1 (V2, V3 . . . ) may be a type of vehicle that is provided with an automatic driving device for automatic driving based on the instruction information D3 or the like that is transmitted from the vehicle operation center 300, or may be a type of vehicle driven manually by a driver based on the instruction information or the like.

(Example of Dividing Time-Sequential Load Data)

An example of dividing the time-sequential load data D1 will be described with reference to FIG. 4.

Figure 4:
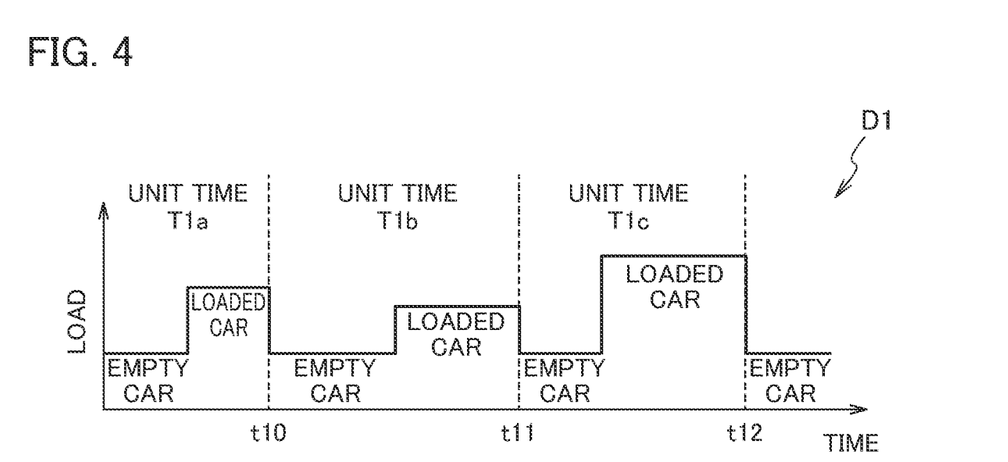
FIG. 4 is an explanatory view illustrating an example of dividing time-sequential load data.

The example illustrated in FIG. 4 illustrates a case where the time-sequential load data D1 is divided by separating the time-sequential load data D1 according to the unit times T1a, T1b, T1c . . . .

For example, the unit times T1a, T1b, T1c . . . are separated and divided according to the timings t10, t11, t12 . . . at which there is a transition from an empty state to a loaded state and again to the empty state with respect to loaded items, in the loading vehicles V1 (V2, V3 . . . ).

The change from the loaded state to the empty state can be detected based on the calculation result of the load change data calculation unit 206 that calculates the data on a change in the load.

The respective lengths of the unit times T1a, T1b, T1c . . . can be changed according to a change in the load of the loaded item of each loading vehicle V1 (V2, V3 . . . ).

This makes it possible to calculate respective representative values for each piece of divided data of the time-sequential load data D1 separated according to the unit times T1a, T1b, T1c . . . , and to predict the temperature of the tires 10 (10a, 10b . . . ), at a specific time point, based on the respective representative values for each piece of divided data, thereby reducing the computational load when predicting the temperature of the tires compared to using all of the time-sequential data.

(Example of Dividing Time-Sequential Speed Data)

An example of dividing the time-sequential speed data D2 will be described with reference to FIG. 5.

Figure 5:
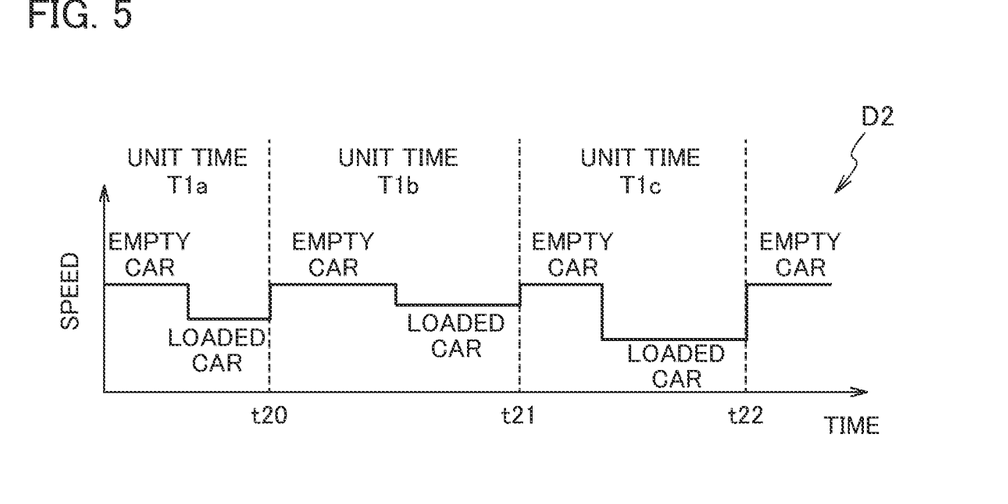
FIG. 5 is an explanatory view illustrating an example of dividing time-sequential speed data.

The example illustrated in FIG. 5 illustrates a case where the time-sequential speed data D2 is divided by separating the time-sequential speed data D2 according to the unit times T1a, T1b, T1c . . . .

For example, the unit times T1a, T1b, T1c . . . are separated and divided according to the timings t20, t21, t22 . . . at which there is a transition from an empty state to a loaded state and again to the empty state with respect to loaded items, in the loading vehicles V1 (V2, V3 . . . ).

The change from the loaded state to the empty state can be detected based on the calculation result of the load change data calculation unit 206 that calculates the data on a change in the load as described above.

The respective lengths of the unit times T1a, T1b, T1c . . . can be changed according to a change in the load of the loaded item of each loading vehicle V1 (V2, V3 . . . ).

This makes it possible to calculate the respective representative values for each piece of divided data of the time-sequential speed data D2 separated according to the unit times T1a, T1b, T1c . . . , and to predict the temperature at a specific time point of the tires 10 (10a, 10b . . . ) with the respective representative values for each piece of divided data being taken into consideration, thereby reducing the computational load when predicting the temperature of the tires compared to using all of the time-sequential data.

(Tire Temperature Prediction Calculation Processing)

Figure 6:
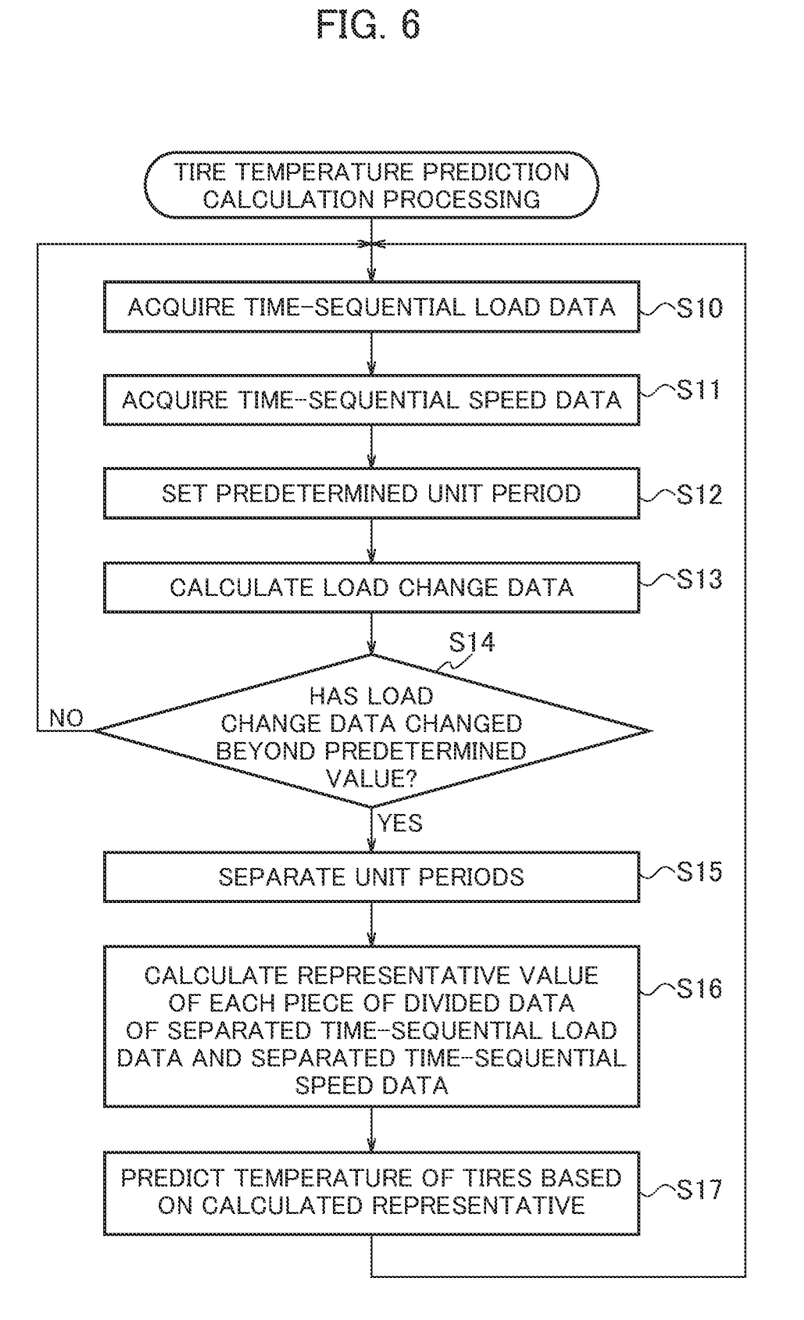
FIG. 6 is a flow chart illustrating an example of a processing procedure of tire temperature prediction calculation processing executed by the tire temperature prediction system according to the embodiment.

A processing procedure of tire temperature prediction calculation processing executed by the tire temperature prediction system S1 will be described with reference to the flowchart of FIG. 6.

When this processing has started, the time-sequential load data D1 of the loading vehicles V1 (V2, V3 . . . ) is first acquired in step S10, and the processing proceeds to step S11.

In step S11, the time-sequential speed data D2 of the loading vehicles V1 (V2, V3 . . . ) is acquired, and the processing proceeds to step S12.

In step S12, a predetermined unit period is set, and the processing proceeds to step S13. The length of the unit time may be changed according to a change in the load of the loaded item of each loading vehicle V1 V2, V3 . . . ).

In step S13, the load change data is calculated, and the processing proceeds to step S14.

In step S14, it is determined whether the load change data has changed beyond a predetermined value (a threshold value, or the like).

If the determination result is "No", the processing returns to step S10, and if the determination result is "Yes", the processing proceeds to step S15.

In step S15, the unit periods are separated at the timings when the load change data has changed beyond a predetermined value (a threshold value, or the like), and the time-sequential load data D1 and the time-sequential speed data D2 are divided, and the processing proceeds to step S16.

In step S16, a representative value (an average value, a median value, a mode value) of each piece of divided data of the separated time-sequential load data D1 and the separated time-sequential speed data D2 is calculated, and the processing proceeds to step S17.

In step S17, the temperature of the tires 10 (10a, 10b . . . ) is predicted based on the calculated representative value (an average value, a median value, a mode value), and the processing returns to step S10.

Note that, regarding the temperature prediction, the techniques disclosed in JP 2007-210527 A, JP 2007-210528 A, JP 2018-86892 A, or the like may be applied.

This processing makes it possible to reduce the computational load when predicting the temperature of the tires compared to using all of the time-sequential data.

Then, the data on the predicted tire temperature predicted by the above processing can be transmitted to the vehicle operation center 300.

Based on the data on the predicted tire temperature or the like, the vehicle operation center 300 can give an instruction to change the operation of each loading vehicle V1 (V2, V3 . . . ).

More specifically, for example, when the temperature of the tires 10 (10a, 10b . . . ) increases, the instruction information D3 that instructs the loading vehicle to change the travel path from 1 to 2 illustrated in FIG. 3 or to reduce the travel speed can be transmitted to the on-board vehicle 150 via the wireless link N4, so as to reduce the burden on the tires 10 (10a, 10b . . . ).

This makes it possible to reduce the burden on the tires 10 (10a, 10b . . . ) of each loading vehicle V1 (V2, V3 . . . ), thereby making it possible to perform safer and more efficient vehicle operation.

The tire temperature prediction system, the tire temperature prediction program, and the tire temperature prediction method of the present invention have been described based on the illustrated embodiment; however, the present invention is not limited to the illustrated embodiment, and the configuration of each component can be replaced by any other configurations having equivalent functions.

For example, the internal temperature of the tires can be predicted by utilizing measured data of the internal temperature of the tires and learning existing data.

In addition, the internal temperature of the tires can be predicted by utilizing the theoretical temperature gradient in the tires, using FEM (finite element method) analysis.

The temperature gradient in the tires acquired by using FEM can be calculated and predicted in a sequential manner, taking changes in the environment and operation into consideration.

In addition, the temperature prediction may be corrected according to the type of vehicle, wear condition of the tires, and outside air temperature.

In addition, an average speed may be calculated from GPS data. In addition, criteria for separating the unit periods may take into account the speed of change in addition to the magnitude of a change in load.

The load data may be acquired from an on-board sensor of the loading vehicles V1 (V2, V3 . . . ), the excavator 500, or the like.

The load change data may be acquired from a change in data of the on-board sensor, or may be acquired from an input operation from the driver, a geofence, or the like.

EXPLANATION OF THE REFERENCE NUMERALS

S1: Tire temperature prediction system
SN1: Sensor module
SN2: Load sensor
SN3: Vehicle speed sensor
V1, V2, V3 . . . : Loading vehicle
10 (10a, 10b . . . ): Tire
101: Time-sequential load data acquisition unit
102: Time-sequential speed data acquisition unit
103: Communication unit
150: On-board device
202: Unit period setting unit
203: Data division unit
204: Representative value calculation unit
205: Tire temperature prediction unit
206: Load change data calculation unit
200: Tire information management server
300: External system (vehicle operation center)

The invention claimed is:

1. A tire temperature prediction system, comprising:
a first processor; and
a second processor,
wherein the first processor is configured to acquire data on a load of a predetermined loaded item in a time-sequential manner regarding a loading vehicle capable of loading the predetermined loaded item, and
wherein the second processor is configured to:
set lengths of predetermined unit periods according to a change in the load from a loaded state to an unloaded state or from the unloaded state to the loaded state;
divide time-sequential load data on the load of the loaded item by separating the time-sequential load data according to the unit periods;
calculate respective representative values for each piece of divided data of the time-sequential load data as divided; and
predict a temperature of tires mounted on the loading vehicle, at a specific time point, based on the respective representative values.

2. The tire temperature prediction system according to claim 1,
wherein the first processor is configured to acquire data on speed of the loading vehicle in a time-sequential manner,
wherein the second processor is configured to:
divide time-sequential speed data on the speed of the loading vehicle by separating the time-sequential speed data according to the predetermined unit periods;
calculate respective representative values for each piece of divided data of the time-sequential speed data as divided; and
predict the temperature of the tires mounted on the loading vehicle, at a specific time point, with the respective representative values for each piece of divided data of the time-sequential speed data being taken into consideration.

3. The tire temperature prediction system according to claim 2, wherein the second processor is configured to:
calculate data on a change in the load; and
separate and set the unit periods when the data on the change in the load changes beyond a predetermined value.

4. The tire temperature prediction system according to claim 2, wherein
the representative value includes either an average value, a median value, or a mode value in a unit period.

5. The tire temperature prediction system according to claim 1, wherein the second processor is configured to:
calculate data on a change in the load; and
separate and set the unit periods when the data on the change in the load changes beyond a predetermined value.

6. The tire temperature prediction system according to claim 5, wherein the representative value includes either an average value, a median value, or a mode value in a unit period.

7. The tire temperature prediction system according to claim 1, wherein
the representative value includes either an average value, a median value, or a mode value in a unit period.

8. The tire temperature prediction system according to claim 1, wherein the first processor is configured to receive an instruction to change a travel speed or a travel path of the loading vehicle based on the predicted temperature.

9. The tire temperature prediction system according to claim 8, wherein the loading vehicle is an autonomous vehicle, and the travel speed or the travel path of the loading vehicle is changed based on the predicted temperature;
first processor is configured to receive an instruction to change operation of the loading vehicle based on the predicted temperature.

10. The tire temperature prediction method according to claim 1, wherein the first processor is configured to receive an instruction to change a travel speed or travel path of the loading vehicle based on the predicted temperature.

11. The tire temperature prediction method according to claim 10, wherein the loading vehicle is an autonomous vehicle, and the travel speed or the travel path of the loading vehicle is changed based on the predicted temperature.

12. A non-transitory computer readable recording medium storing a tire temperature prediction program executed by a tire temperature prediction system, comprising:
a time-sequential load data acquisition step of acquiring data on a load of a predetermined loaded item in a time-sequential manner regarding a loading vehicle capable of loading the predetermined loaded item;
a unit period setting step of setting lengths of predetermined unit periods according to a change in the load from a loaded state to an unloaded state or from the unloaded state to the loaded state;
a data division step of dividing time-sequential load data on the load of the loaded item by separating the time-sequential load data according to the predetermined unit periods;
a representative value calculation step of calculating respective representative values for each piece of divided data of the time-sequential load data divided in the data division step; and
a tire temperature prediction step of predicting a temperature of tires mounted on the loading vehicle, at a specific time point, based on the respective representative values.

13. The non-transitory computer readable recording medium storing the tire temperature prediction program according to claim 12, further comprising:
a time-sequential speed data acquisition step of acquiring data on speed of the loading vehicle in a time-sequential manner, wherein
in the data division step, time-sequential speed data on the speed of the loading vehicle is divided by separating the time-sequential speed data the according to the unit periods,
in the representative value calculation step, respective representative values are calculated for each piece of divided data of the time-sequential speed data divided in the data division step, and
in the tire temperature prediction step, the temperature of the tires mounted on the loading vehicle is predicted, at a specific time point, with the respective representative values for each piece of divided data of the time-sequential speed data being taken into consideration.

14. The non-transitory computer readable recording medium storing the tire temperature prediction program according to claim 12, wherein the first processor is configured to receive an instruction to change a travel speed or travel path of the loading vehicle based on the predicted temperature.

15. The non-transitory computer readable recording medium storing the tire temperature prediction program according to claim 14, wherein the loading vehicle is an autonomous vehicle, and the travel speed or the travel path of the loading vehicle is changed based on the predicted temperature.

16. A tire temperature prediction method, comprising:
a time-sequential load data acquisition process of acquiring data on a load of a predetermined loaded item in a time-sequential manner regarding a loading vehicle capable of loading the predetermined loaded item;
a unit period setting process of setting lengths of predetermined unit periods according to a change in the load from a loaded state to an unloaded state or from the unloaded state to the loaded state;
a data division process of dividing time-sequential load data on the load of the loaded item by separating the time-sequential load data according to the unit periods;
a representative value calculation process of calculating respective representative values for each piece of divided data of the time-sequential load data divided in the data division process; and
a tire temperature prediction process of predicting a temperature of tires mounted on the loading vehicle, at a specific time point, based on the respective representative values.

17. The tire temperature prediction method according to claim 16, further comprising:
a time-sequential speed data acquisition process of acquiring data on speed of the loading vehicle in a time-sequential manner, wherein
in the data division process, time-sequential speed data on the speed of the loading vehicle is divided by separating the time-sequential speed data according to the unit periods,
in the representative value calculation process, respective representative values are calculated for each piece of divided data of the time-sequential speed data divided in the data division process, and in the tire temperature prediction process, a temperature of the tires mounted on the loading vehicle is predicted, at a specific time point, with the respective representative values for each piece of divided data of the time-sequential speed data being taken into consideration.

\* \* \* \* \*